May 22, 1934.　　　　C. SAURER　　　1,959,969
RESILIENT MOTOR SUPPORT
Filed May 9, 1931
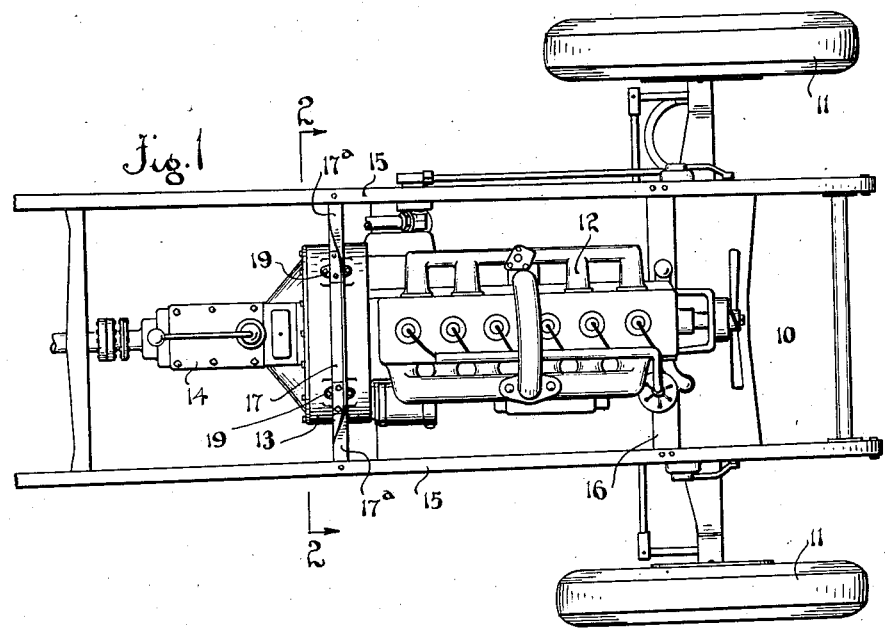
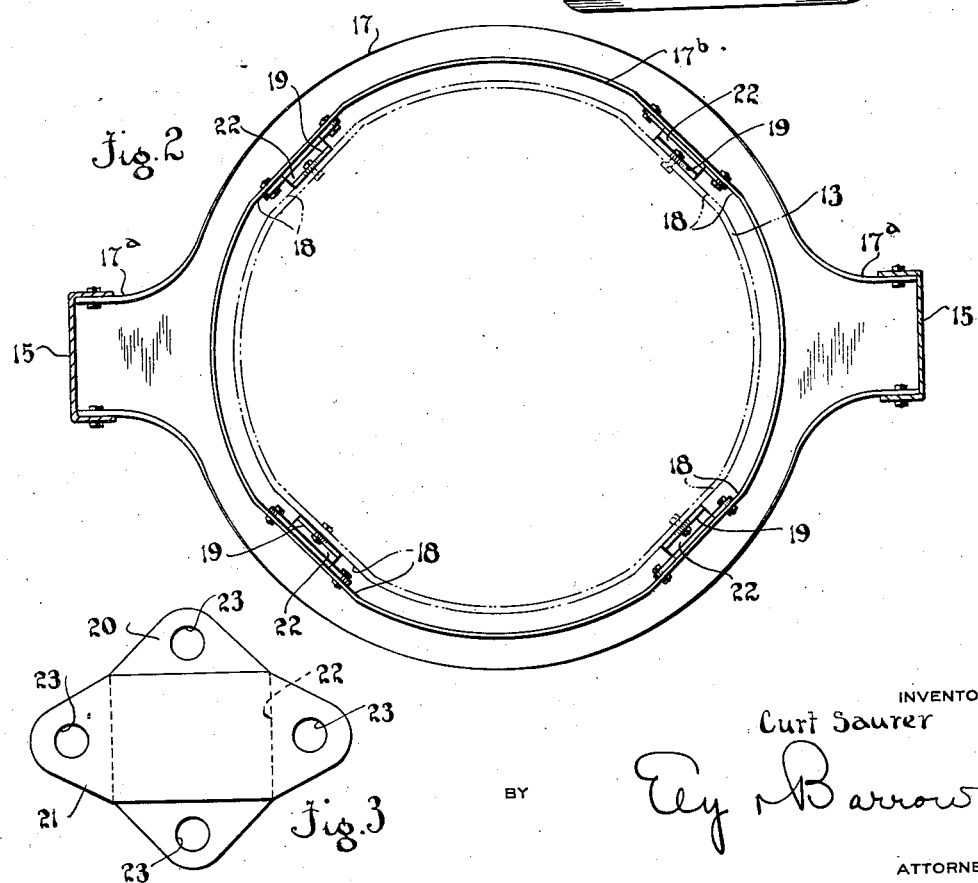
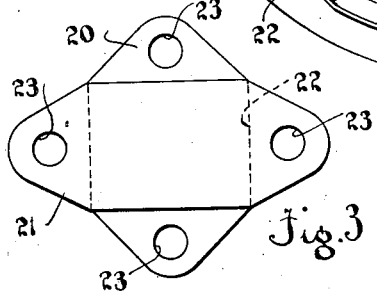
INVENTOR
Curt Saurer
BY Ely Barrow
ATTORNEYS Patented May 22, 1934

1,959,969

UNITED STATES PATENT OFFICE 1,959,969

RESILIENT MOTOR SUPPORT

Curt Saurer, Akron, Ohio, assignor to The Firestone Tire & Rubber Company, Akron, Ohio, a corporation of Ohio Application May 9, 1931, Serial No. 536,238

3 Claims. (Cl. 248—14.2)

This invention relates to resilient motor supports, and more especially it relates to resilient supports adapted to absorb or dampen the torque and torque reaction vibration and an internal combustion engine mounted in a motor propelled vehicle.

The chief objects of the invention are to increase the riding comfort of a motor vehicle by reducing vibration thereof; and to reduce wear and tear on the vehicle due to vibration. More specifically the invention is directed to the elimination or dampening of vibration in the vehicle chassis from torque or torque reaction of the motor of the vehicle. A further object is the provision of simple and efficient means for attaining the foregoing objects. A further object is to provide a resilient motor support comprising a single structure capable of absorbing torsional, lateral, and axial motor vibration.

Of the accompanying drawing:

Figure 1 is a fragmentary plan view of the chassis of a motor vehicle including the motor, and the improved resilient motor support, in its preferred form, associated therewith;

Figure 2 is a section on the line 2—2 of Figure 1; and

Figure 3 is a plan view of one of the resilient elements of the improved motor support.

Referring to the drawing, 10 is the front end of the chassis of a motor vehicle including wheels 11, 11 and motor 12, the latter having the usual fly-wheel housing 13 and transmission housing 14 connected thereto. The chassis also includes side frame members or channels 15, 15, and a transverse member 16 at the front upon which the front end of the motor 12 is supported in the usual manner, preferably upon resilient supports (not shown) which absorb lateral, vertical, and axial vibration of the motor.

The rear end of the motor 12 is supported in an annular yoke 17 that circumscribes the fly-wheel housing 13 in spaced relation thereto, said yoke being formed with laterally extending ears or brackets 17ª, 17ª that are secured to and supported by the respective frame channels 15, with or without resilient insulation therebetween. The yoke is generally of channel construction for strength, and has a laterally extending flange 17ᵇ formed on its inner periphery. At four equally spaced points about the axis of the fly-wheel and yoke, the fly-wheel housing 13 and the yoke 17 are locally flattened on their adjacent surfaces as shown at 18, 18, and said points preferably are spaced 45 degrees from the vertical and horizontal axial planes of housing and yoke. Mounted between the housing 13 and yoke 17, in the flattened regions 18, are resilient connections generally designated 19, which connections are disposed substantially tangentially with relation to the periphery of the housing 13.

Each resilient connection 19 comprises respective metal plates 20, 21 joined by an intervening layer or cushion of resilient rubber 22 that preferably is vulcanized to said plates. Two opposite marginal portions of each plate extend beyond the cushion 22 and are formed with apertures 23, 23 for the reception of bolts or rivets by which the plates are secured respectively to the housing 13 and yoke-flange 17ᵇ. The plates may be of different widths, as is shown in Figure 3, so that the cushion 22 is rectangular in shape, and in mounting the structure 19 between the housing 13 and yoke 17 the cushion is so positioned as to receive torsional vibration in the direction of its short dimension and axial vibration in the direction of its long dimension.

However, the cushion 22 may be square if desired, and in either case torsional action and reaction of the motor will be absorbed by the tention of the rubber cushion, and little, if any, transmitted to the frame of the vehicle.

Lateral vibration of the motor, both horizontal and vertical, is received by the connections 19 substantially in the direction of their thickness, and the arrangement of the connections about the housing 13 is such that they share equally in the absorbing of said vibrations. The connections absorb lateral vibration by their resistance to compression.

The construction requires only moderate change in existing vehicle construction. The connections 19 are easily mounted and removed when required, and accomplish the several advantages set forth in the foregoing statement of objects.

Modifications are possible within the scope of the appended claims which are not limited wholly to the specific construction shown and described.

What is claimed is:

1. In a motor vehicle, the combination of an annular motor support yoke, a motor having a cylindrical housing portion positioned within said yoke, and a plurality of cushioning members connecting said housing to said yoke, each of said cushioning members comprising a pair of metal plates, one of each of said pairs of plates being positioned radially outwardly of the other with respect to the axis of said cylindrical housing, said plates being connected by an intermediate layer of rubber vulcanized to each of them, said cushioning members being arranged tangentially to the motor housing and inclined to the vertical and horizontal, said cushioning members being adapted to absorb axial vibrations of said motor by subjecting the rubber layers to shear stress.

2. In a motor vehicle, the combination of an annular motor support yoke, a motor having a cylindrical portion positioned within said yoke, and a plurality of cushioning members connecting said housing to said yoke, each of said cushioning members comprising a relatively thin, rectangular cushion of rubber having attaching plates vulcanized to opposite faces thereof, one of said attaching plates of each of the cushioning members lying radially outwardly of the other of said attaching plates with respect to the axis of the cylindrical portion of said motor, the cushions being arranged tangentially to the motor housing and inclined to the vertical and horizontal to receive lateral vibration in the direction of their thickness and to receive axial and torsional vibration in the direction of their respective planes.

3. In a motor vehicle the combination of a motor support yoke, an internal combustion motor having a rotatable crankshaft and a surrounding casing portion positioned within said yoke, and a plurality of cushioning members connecting said casing to said yoke, each of said cushioning members comprising a pair of metal plates, one of said plates lying radially outwardly of the other with respect to the axis of said crankshaft, said plates being connected by an intermediate layer of rubber bonded to each of said plates, said cushioning members being arranged tangentially to the motor casing and inclined to the vertical and horizontal, whereby torque reactions of said motor casing will be absorbed by shear stress of said rubber layer while horizontal and vertical movements will be absorbed by compression of one or more of said cushioning members.

CURT SAURER.